US009972361B2

(12) United States Patent
Goldberg et al.

(10) Patent No.: US 9,972,361 B2
(45) Date of Patent: May 15, 2018

(54) AUDIBLE MAPPING OF PHYSICAL HARD DISK DEVICES WITHIN A STORAGE SYSTEM

(71) Applicant: INTERNATIONAL BUSINESS MACHINES CORPORATION, Armonk, NY (US)

(72) Inventors: Itzhack Goldberg, Hadera (IL); Harry McGregor, Tucson, AZ (US); Christopher B. Moore, Vail, AZ (US); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 14/968,256

(22) Filed: Dec. 14, 2015

(65) Prior Publication Data
US 2017/0169859 A1 Jun. 15, 2017

(51) Int. Cl.
*G06F 12/00* (2006.01)
*G11B 33/12* (2006.01)
*G11B 20/12* (2006.01)
*H04R 29/00* (2006.01)

(52) U.S. Cl.
CPC ........ *G11B 33/121* (2013.01); *G11B 20/1217* (2013.01); *H04R 29/00* (2013.01); *G11B 2020/1241* (2013.01)

(58) Field of Classification Search
CPC . G06F 17/40; G06F 3/16; G06F 3/165; G06F 3/167; G11B 33/121; G11B 20/1217; G11B 2010/1241; H04R 29/00; H04N 5/357
See application file for complete search history.

(56) References Cited

U.S. PATENT DOCUMENTS

| 5,526,212 | A |  | 6/1996 | Drouin |
| 5,875,067 | A |  | 2/1999 | Morris et al. |
| 6,157,116 | A | * | 12/2000 | Sampietro ............ G10K 11/178 310/334 |
| 6,229,668 | B1 | * | 5/2001 | Huynh ................. G11B 25/043 360/97.19 |
| 6,947,252 | B2 |  | 9/2005 | Kang et al. |
| 7,139,401 | B2 |  | 11/2006 | Culman et al. |
| 7,787,636 | B1 |  | 8/2010 | Yanning et al. |
| 8,159,775 | B2 |  | 4/2012 | Armendariz et al. |
| 8,792,196 | B1 | * | 7/2014 | Lee ................. G11B 20/10046 360/39 |
| 9,053,747 | B1 | * | 6/2015 | Zhang ................. G11B 20/182 |
| 2003/0147173 | A1 |  | 8/2003 | Fujie et al. |

(Continued)

FOREIGN PATENT DOCUMENTS

| EP | 1400967 A2 | 3/2004 |
| GB | 2297188 A | 7/1996 |
| GB | 2510069 A | 7/2014 |

*Primary Examiner* — Hiep Nguyen

(74) *Attorney, Agent, or Firm* — Griffiths & Seaton PLLC

(57) ABSTRACT

Various embodiments for audibly mapping computing components in a computer storage system, by a processor device, are provided. In one embodiment, a method comprises creating a detectible audible pattern using an actuator arm and head assembly of a hard disk drive operating in the computer storage system for physically mapping the hard disk drive to a logical location within the computer storage system.

6 Claims, 6 Drawing Sheets

(56) References Cited

U.S. PATENT DOCUMENTS

| | | | |
|---|---|---|---|
| 2003/0187527 A1* | 10/2003 | Delchar | G10K 11/1788 700/94 |
| 2004/0034482 A1 | 2/2004 | Gross et al. | |
| 2004/0205403 A1* | 10/2004 | Markow | G11B 27/36 714/30 |
| 2014/0093105 A1* | 4/2014 | Okano | G10H 5/02 381/124 |

* cited by examiner

AUDIBLE MAPPING OF PHYSICAL HARD DISK DEVICES WITHIN A STORAGE SYSTEM

BACKGROUND OF THE INVENTION

Field of the Invention

The present invention relates in general to computing systems, and more particularly, to various embodiments for audibly mapping computing components in computer storage environments.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. These computer systems may also include virtual storage components.

SUMMARY OF THE INVENTION

Various embodiments for audibly mapping computing components in a computer storage system, by a processor device, are provided. In one embodiment, a method comprises creating a detectible audible pattern using an actuator arm and head assembly of a hard disk drive operating in the computer storage system for physically mapping the hard disk drive to a logical location within the computer storage system.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
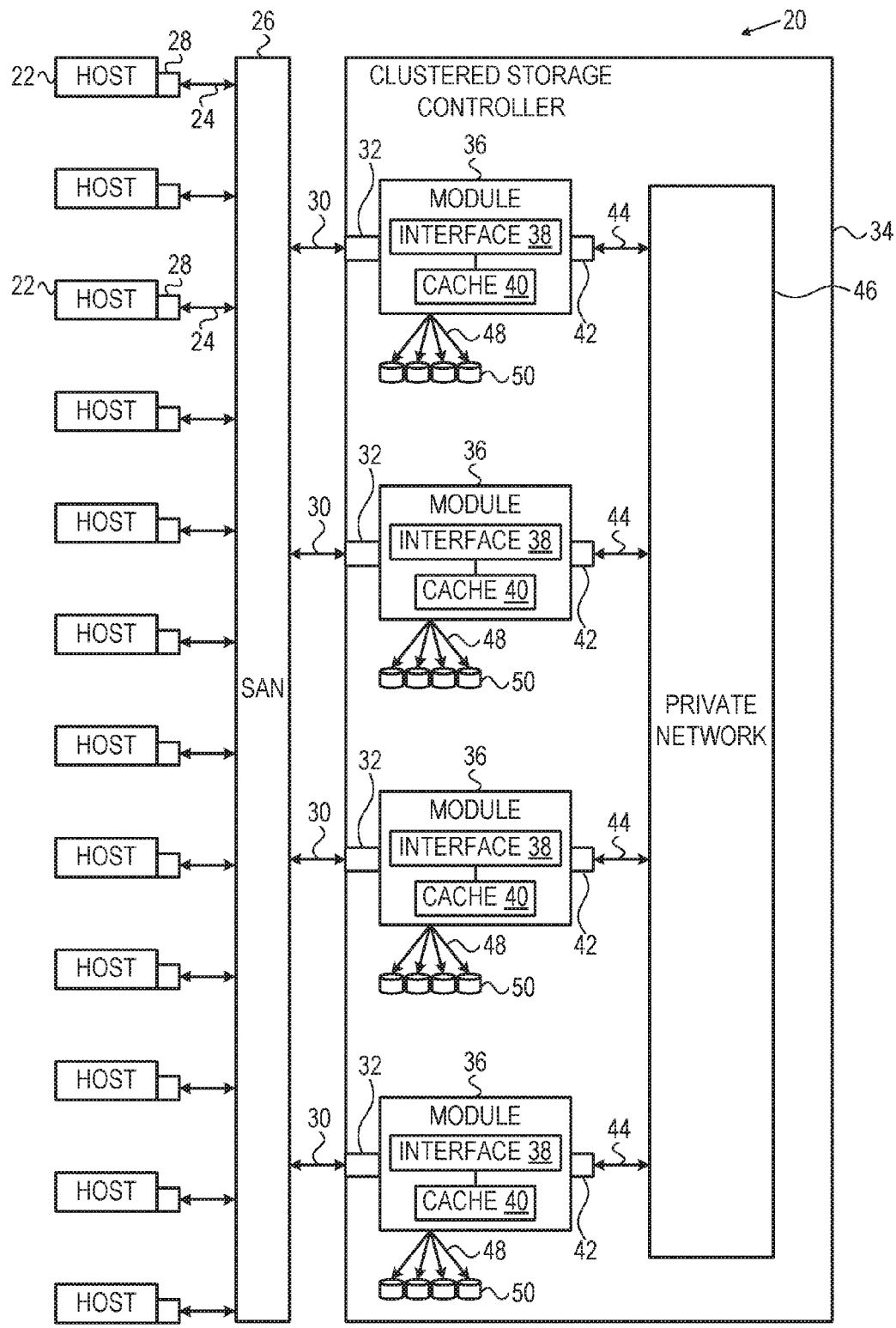
FIG. 1 illustrates a block diagram illustrating a computer storage environment in which aspects of the present invention may be realized.

Described embodiments, and illustrative Figures of various embodiments for audibly mapping computing components in a computer storage system are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

The advent of modern storage solutions has blurred the line between highly integrated software and hardware implementations, and in many cases no longer provides the level of integration formerly seen in more traditional types of storage. Many of these systems may discontinue use of a hard disk drive based on performance characteristics, while the underlying hardware may or may not have identified the hard disk drive as failed. This results in a situation where hardware problem indicators, if they even exist, may not be triggered. This in turn may result in situations where it may be very difficult for a technician to physically identify a hard disk drive which has been failed by a software defined storage solution.

At present, many storage implementations require the technician to physically map a location of a hard disk drive to the logical location within the software environment. This physical mapping, in most cases, must be done while the storage is off-line or before the solution is deployed. This physical mapping can be a tedious and time consuming process which is prone to errors, as it relies on physical removal of devices for identification. In addition, a physical map which was created in the past may not be available when a failure of a hard disk drive occurs resulting in an unfortunate situation where a technician may have to guess which hard disk drive requires removal. Removal of an incorrect hard disk drive can have serious consequences for system availability and in some cases data integrity.

In view of the foregoing, the mechanisms of the illustrated embodiments provide various solutions to previous challenges of physically mapping computing components such as hard disk drives in computer storage systems. These mechanisms include such functionality as using a detectible audible pattern to physically map hard disk drives to a logical location within the storage system, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
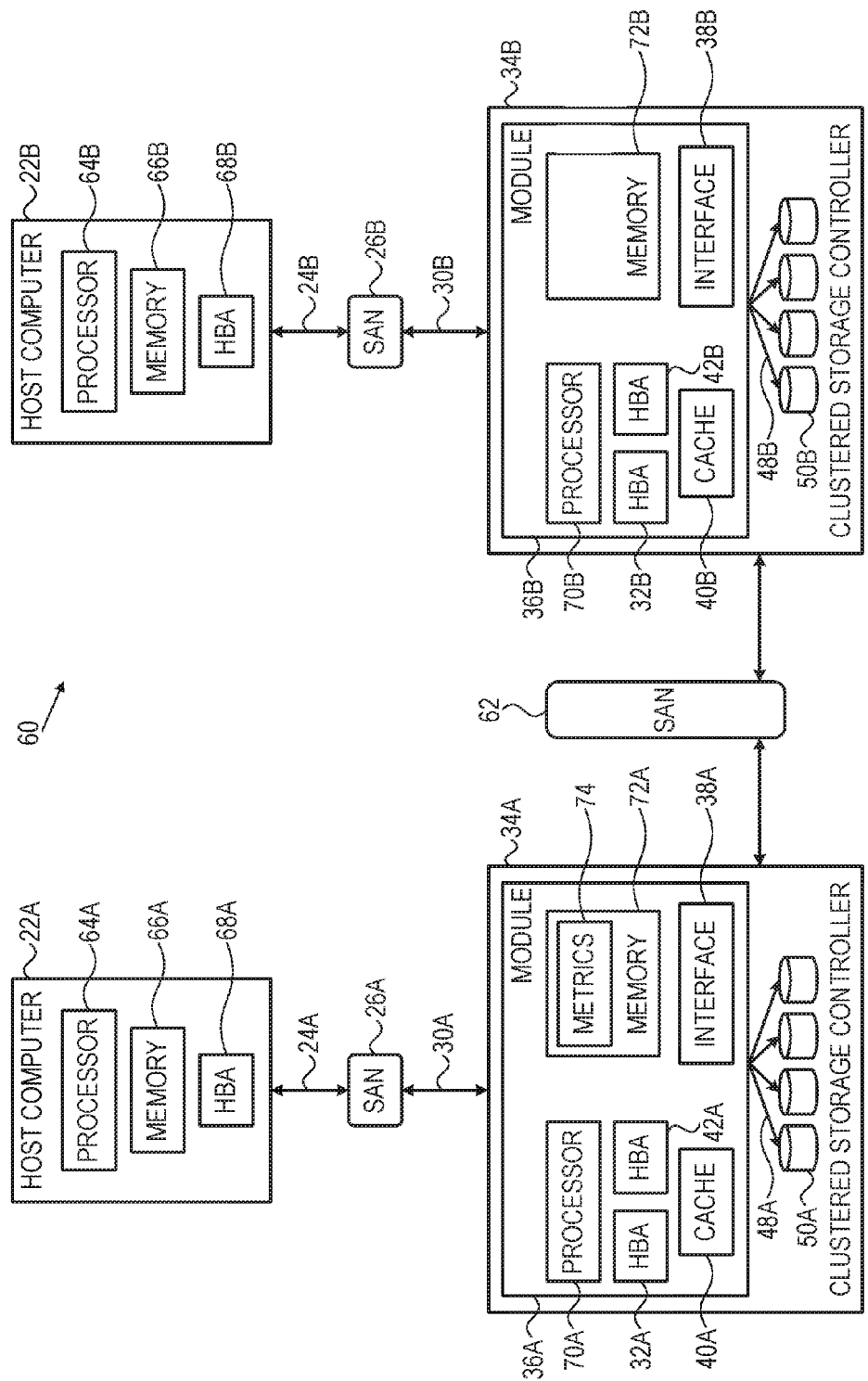
FIG. 2 illustrates a block diagram illustrating a hardware structure of an exemplary data storage system in a computer system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A.

Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
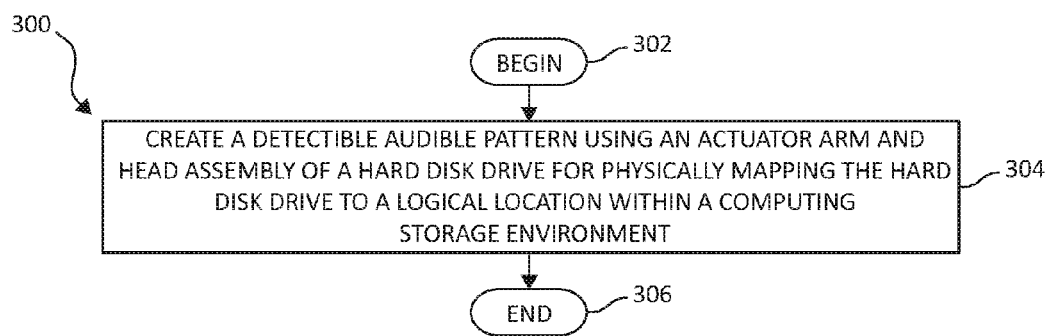
FIG. 3 illustrates a flow chart of a method for audibly mapping computing components in a computer storage system.

Continuing to FIG. 3, a method 300 for audibly mapping computing components in a computer storage system is illustrated, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 302, a detectible audible pattern is created using an actuator arm and head assembly of a hard disk drive for physically mapping the hard disk drive to a logical location within a computing storage environment (step 304). The method ends (step 306).

In various described embodiments, the present invention enables a computer storage system to activate each hard disk drive operating within the system in such a way that the actuator arm and head assembly of the hard disk drive creates a detectable audible pattern. This allows a technician to accurately map hard disk drive locations regardless if there is a location map available at the time of service, and is accomplished by using tools which are sensitive to audio changes to help facilitate in locating the component which needs to be replaced. Under the mechanisms of the present invention, a handheld device (smart device) with appropriate software and hardware works in conjunction with location software on the storage system. This eliminates the risk of human error and drastically lowers the potential of incorrect drive removal.

As aforementioned, the present invention leverages the ability of a storage solution to activate the actuator arm and head assembly of hard disk drives to create a detectable audible pattern. This may even be performed by storage systems that lack tight hardware/software integration, meaning that both bare metal installations as well as virtualized appliances may benefit from the mechanisms of the present invention to map storage components.

In one embodiment, a simplified mapping of a plurality of hard disk drives is enabled within a storage system. The process to accurately map the hard disk drives requires that the storage system have read access to the hard disk drives and that the they have a functioning actuator arm and head assemblies. A pattern of read operations are initiated in which moves the actuator arm and head assembly across the entire platters of the hard disk drive, and is repeated creating specific additional audible characteristics which are detected externally. A technician then uses an input source, such as a microphone, of a handheld device (smart device) executing an application that is in communication with the storage system software to identify the repeating pattern of read operations that produce the detectible audible pattern. The handheld device is placed in close proximity to a target hard disk drive while the storage system cycles the repeating pattern of read operations through the plurality of hard disk drives in the storage array until the target disk drive (the disk drive placed in close proximity to the handheld device) is identified. The physical location tied to the logical location of the identified drive is then saved on a map on either the handheld device, the storage system software, or both.

Figure 4:
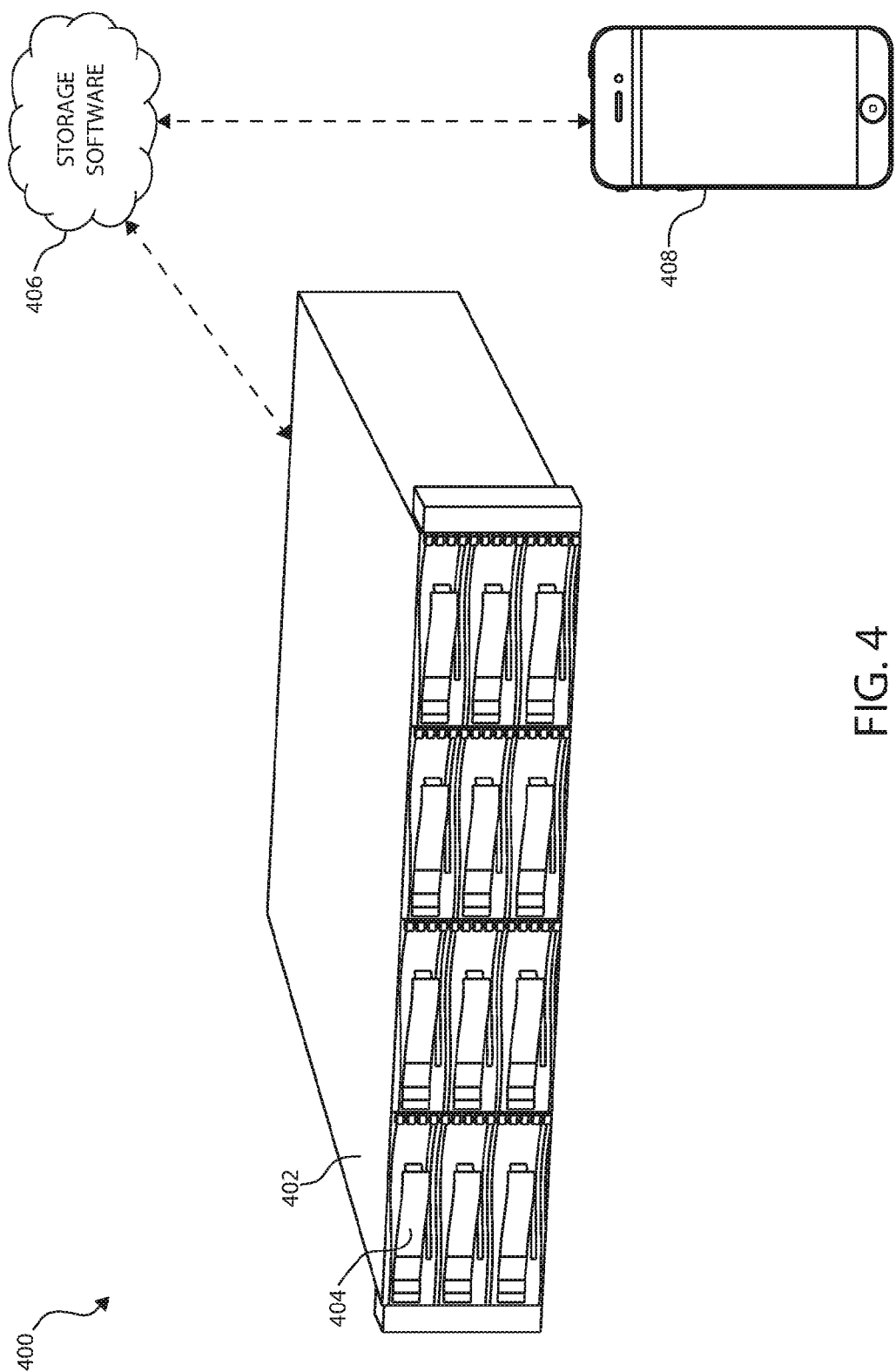
FIG. 4 illustrates a block diagram illustrating a hardware structure of a data storage system in a computer system and handheld device in accordance with aspects of the present invention.

FIG. 4 illustrates a block diagram illustrating a hardware structure 400 of a data storage system in a computer system and handheld device in accordance with aspects of the present invention. Illustrated is a storage array 402 having a plurality of hard disk drives. For the purposes of this example, hard disk drive 404 is depicted as a target hard disk drive to be identified and mapped. Also illustrated is storage system software 406, and handheld device (smart device) 408. The handheld device 408 is in communication by an executed application (not shown) with the storage array 402 via the storage system software 406. This connection may be established physically (e.g. through a cable), through a blue tooth or Wi-Fi signal, or any other appropriate connection known in the art. The handheld device contains an external or internal input source microphone for capturing the detectible audible pattern.

Figure 5:
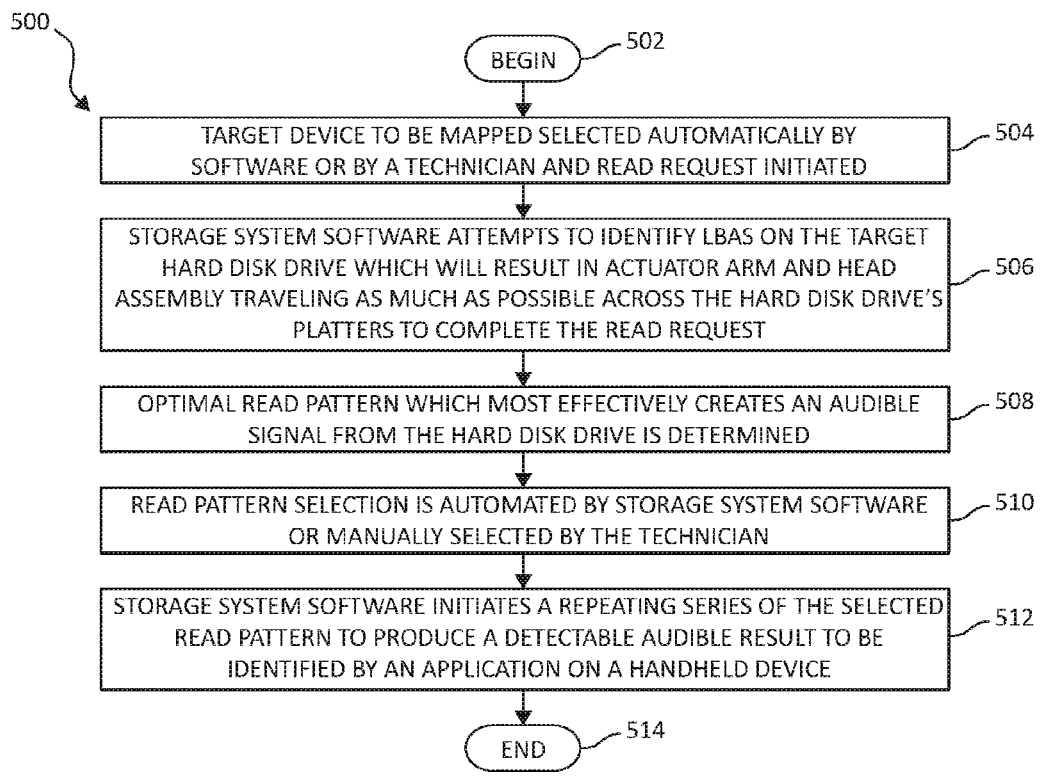
FIG. 5 illustrates an additional flow chart of a method for audibly mapping computing components in a computer storage system.

FIG. 5 illustrates an additional flow chart of a method 500 for audibly mapping computing components in a computer storage system by initiating the pattern of repeating read operations. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 502, the target hard disk drive 404 to be mapped may be selected either by the technician or automatically by the software on the storage system when mapping all hard disk drives (step 504). The storage system software 406 attempts to identify logical block addresses (LBAs) on the target hard disk drive 404 that result in the actuator arm and head assembly to travel as much as possible bi-directionally across the hard disk drives platters to complete the read request (step 506). An optimal read pattern which will most effectively create an audible signal from the drive is then determined (step 508). These patterns may be varied to account for differences in hard disk drive model, materials and speed of rotation. Selection of read pattern may be automated by the storage system software 406, or may be manually selected by the technician (step 510). The storage system software 406 then initiates a repeating pattern of read operations to produce an audible result which will be identified by the application on the handheld device 408 (step 512). The method ends (step 514).

Figure 6:
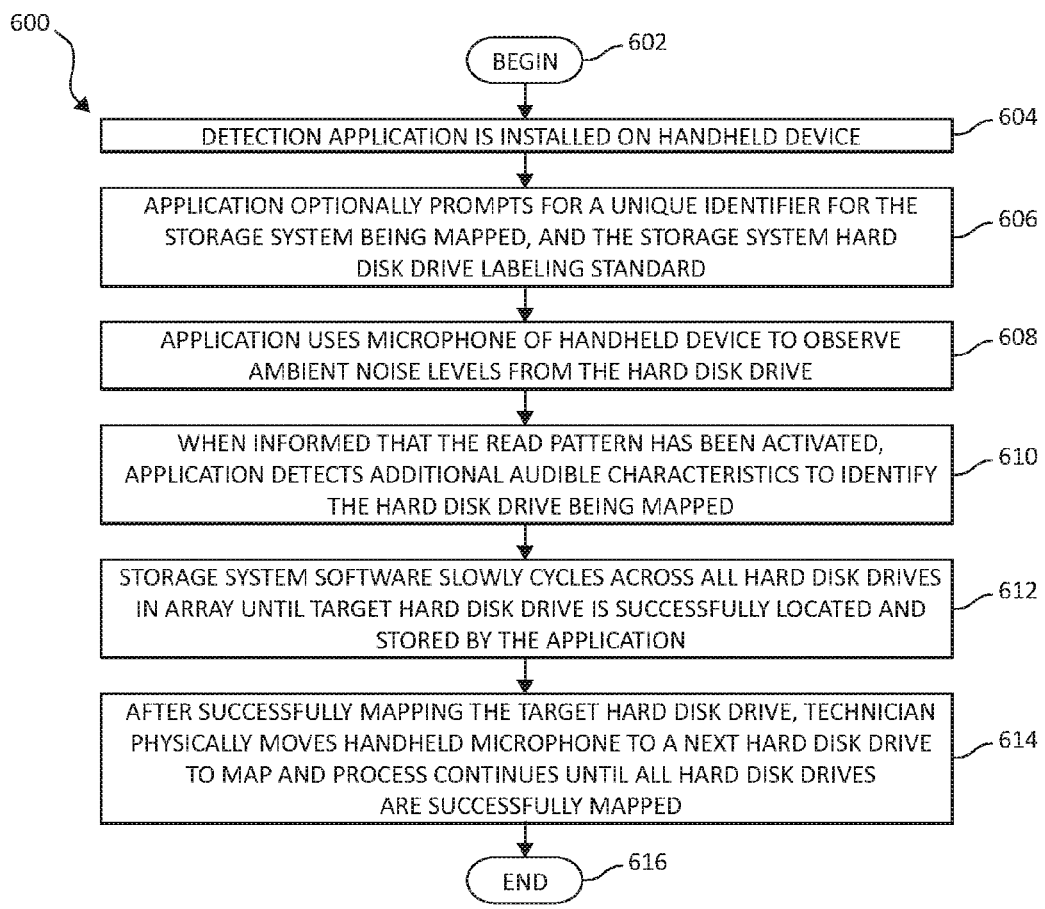
FIG. 6 illustrates still an additional flow chart of a method for audibly mapping computing components in a computer storage system.

FIG. 6 illustrates still an additional flow chart of a method 600 for audibly mapping computing components in a computer storage system by executing the application on the handheld device 408. The method 600 may be performed in accordance with the present invention in any of the environments depicted in FIGS. 1-2, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 602, an application is installed onto the handheld device 408 (step 604). The application will optionally prompt for a unique identifier for the system being mapped and the storage system hard disk drive labeling standard (e.g. /dev/sd* or letter drive names etc.) (step 606). The handheld device 408 is placed in close proximity to the target hard disk drive 404, at which point the application observes ambient noise levels from the hard disk drive (step 608). When informed that the repeating pattern of read operations has been activated, the application looks for the additional audible characteristics to identify the target hard disk drive 404 being mapped (step 610). The application may either be a stand alone system or have integration with the software running on the storage solution as to know when to listen for the detectible audible pattern. The storage system software 406 slowly cycles the repeating pattern of read operations across all the hard disk drives in the array until the target hard disk drive 404 has been successfully located via the detectible audible pattern and the cycling stops until the next initiation (step 612). The physical location of the located hard disk drive is saved to a map on either the handheld device 408, the storage system software 406, or both. Once the target hard disk drive 404 has been mapped, input source (microphone) is physically moved by the technician to the next hard disk drive to map, and the process repeats until all hard disk drives in the array are successfully mapped (step 614).

The application on the handheld device 408 may maintain records of past storage system mapping for future reference. This mapping data may be shared between devices utilizing cloud resources or externalized via web based portals.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for audibly mapping computing components in a computer storage system, by a processor device, comprising:

creating a detectible audible pattern using an actuator arm and head assembly of a hard disk drive operating in the computer storage system to physically map the hard disk drive to a logical location within the computer storage system by capturing the detectible audible pattern using a microphone of a handheld device placed in close proximity to the hard disk drive emitting the detectible audible pattern and recognizing the detectible audible pattern by an application executing on the handheld device; wherein the application creates the mapping between a physical location of the hard disk drive cross-referenced with the logical location in the computer storage system by communicating with the computer storage system during the emitting of the detectible audible pattern;

initiating a repeating pattern of read operations on the hard disk drive by the computer storage system for producing the detectible audible pattern;

identifying, by the computer storage system, logical block addresses (LBAs) on the hard disk drive which result in a farthest bidirectional traveling of the actuator arm and head assembly across platters of the hard disk drive when executing the repeating pattern of read operations;

determining an optimal read pattern of the identified LBAs that most effectively creates an audible signal from the hard disk drive;

cycling, by the computer storage system, the repeating pattern of read operations for producing the detectible audible pattern through a plurality of hard disk drives operating within the computer storage system;

stopping the cycling when the application executing on the handheld device placed in close proximity to the hard disk drive emitting the detectible audible pattern captures and recognizes the emitted detectible audible pattern; and saving the physical location of the hard disk drive on a map.

2. The method of claim 1, further including maintaining the map by one of the computer storage system and the application executing on the handheld device of the saved physical location.

3. A system for audibly mapping computing components in a computer storage system, comprising:
a handheld device; and
the computer storage system having at least one processor device, wherein the at least one processor device:
creates a detectible audible pattern using an actuator arm and head assembly of a hard disk drive operating in the computer storage system to physically map the hard disk drive to a logical location within the computer storage system by capturing the detectible audible pattern using a microphone of the handheld device placed in close proximity to the hard disk drive emitting the detectible audible pattern and recognizing the detectible audible pattern by an application executing on the handheld device; wherein the application creates the mapping between a physical location of the hard disk drive cross-referenced with the logical location in the computer storage system by communicating with the computer storage system during the emitting of the detectible audible pattern;
initiates a repeating pattern of read operations on the hard disk drive by the computer storage system for producing the detectible audible pattern;
identifies logical block addresses (LBAs) on the hard disk drive which result in a farthest bidirectional traveling of the actuator arm and head assembly across platters of the hard disk drive when executing the repeating pattern of read operations;
determines an optimal read pattern of the identified LBAs that most effectively creates an audible signal from the hard disk drive;
cycles the repeating pattern of read operations for producing the detectible audible pattern through a plurality of hard disk drives operating within the computer storage system;
stops the cycling when the application executing on the handheld device placed in close proximity to the hard disk drive emitting the detectible audible pattern captures and recognizes the emitted detectible audible pattern; and
saves the physical location of the hard disk drive on a map.

4. The system of claim 3, wherein the at least one processor device maintains the map by one of the computer storage system and the application executing on the handheld device of the saved physical location.

5. A computer program product for audibly mapping computing components in a computer storage system by at least one processor device, the computer program product embodied on a non-transitory computer-readable storage medium having computer-readable program code portions stored therein, the computer-readable program code portions comprising:

an executable portion that creates a detectible audible pattern using an actuator arm and head assembly of a hard disk drive operating in the computer storage system to physically map the hard disk drive to a logical location within the computer storage system by capturing the detectible audible pattern using a microphone of a handheld device placed in close proximity to the hard disk drive emitting the detectible audible pattern and recognizing the detectible audible pattern by an application executing on the handheld device; wherein the application creates the mapping between a physical location of the hard disk drive cross-referenced with the logical location in the computer storage system by communicating with the computer storage system during the emitting of the detectible audible pattern;

an executable portion that initiates a repeating pattern of read operations on the hard disk drive by the computer storage system for producing the detectible audible pattern;

an executable portion that identifies, by the computer storage system, logical block addresses (LBAs) on the hard disk drive which result in a farthest bidirectional traveling of the actuator arm and head assembly across platters of the hard disk drive when executing the repeating pattern of read operations;

an executable portion that determines an optimal read pattern of the identified LBAs that most effectively creates an audible signal from the hard disk drive;

an executable portion that cycles, by the computer storage system, the repeating pattern of read operations for producing the detectible audible pattern through a plurality of hard disk drives operating within the computer storage system;

an executable portion that stops the cycling when the application executing on the handheld device placed in close proximity to the hard disk drive emitting the detectible audible pattern captures and recognizes the emitted detectible audible pattern; and an executable portion that saves the physical location of the hard disk drive on a map.

6. The computer program product of claim 5, further comprising an executable portion that maintains the map by one of the computer storage system and the application executing on the handheld device of the saved physical location.

* * * * *